(12) United States Patent
Lorello et al.

(10) Patent No.: US 8,244,218 B2
(45) Date of Patent: *Aug. 14, 2012

(54) INTELLIGENT QUEUE FOR INFORMATION TELESERVICE MESSAGES WITH SUPERCEDING UPDATES

(75) Inventors: Timothy J. Lorello, Gambrills, MD (US); Reuben D. Hart, Odenton, MD (US); Constantin Horatiu Puscas, Glen Burnie, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/137,748

(22) Filed: Sep. 9, 2011

(65) Prior Publication Data

US 2012/0106724 A1    May 3, 2012

Related U.S. Application Data

(63) Continuation of application No. 12/926,122, filed on Oct. 27, 2010, now Pat. No. 8,019,368.

(51) Int. Cl.
*H04W 4/14* (2009.01)
(52) U.S. Cl. .................................................. 455/412.1
(58) Field of Classification Search .................. None
See application file for complete search history.

(56) References Cited

U.S. PATENT DOCUMENTS

| | | | |
|---|---|---|---|
| 1,103,073 A | 7/1914 | O'Connell |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carroll et al. |
| 5,014,206 A | 5/1991 | Scribner et al. |
| 5,043,736 A | 8/1991 | Darnell et al. |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori et al. |
| 5,119,104 A | 6/1992 | Heller |
| 5,144,283 A | 9/1992 | Arens et al. |
| 5,161,180 A | 11/1992 | Chavous |
| 5,177,478 A | 1/1993 | Wagai et al. |
| 5,193,215 A | 3/1993 | Olmer |
| 5,208,756 A | 5/1993 | Song |
| 5,214,789 A | 5/1993 | George |
| 5,218,367 A | 6/1993 | Sheffer et al. |
| 5,223,844 A | 6/1993 | Mansell et al. |
| 5,239,570 A | 8/1993 | Koster et al. |
| 5,265,630 A | 11/1993 | Hartmann |

(Continued)

*Primary Examiner* — Philip Sobutka
(74) *Attorney, Agent, or Firm* — William H. Bollman

(57) ABSTRACT

A message exchange network storing messages in memories of message storage entities, e.g., a mobile handset, based on the type and content of information within the message. An information service message containing supercedingly updateable information, e.g., a traffic update, is stored using a replacement method by which a previously stored message is replaced by a newly received message. All other types of messages are stored using a conventional append method. A message identifier within the message itself provides information necessary to distinguish between the aforementioned types of messages. In another embodiment, a block of message identifiers is reserved for storage of information service messages. The architectures and methods for receipt, delivery, and storage of messages enables replaceable and/or on demand update of information service messages, provides efficient use of storage memory, avoids numerous stale/obsolete messages, avoids manual selection and deletion of stale/obsolete messages, and avoids unnecessary delivery of stale/obsolete messages.

36 Claims, 14 Drawing Sheets

U.S. PATENT DOCUMENTS

| | | | |
|---|---|---|---|
| 5,266,944 A | 11/1993 | Caroll et al. | |
| 5,289,527 A | 2/1994 | Tiedemann, Jr. | |
| 5,293,642 A | 3/1994 | Lo | |
| 5,299,132 A | 3/1994 | Wortham | |
| 5,325,302 A | 6/1994 | Izidon et al. | |
| 5,334,974 A | 8/1994 | Simms et al. | |
| 5,343,493 A | 8/1994 | Karimullah et al. | |
| 5,347,568 A | 9/1994 | Moody | |
| 5,351,235 A | 9/1994 | Lahtinen | |
| 5,361,212 A | 11/1994 | Class | |
| 5,363,425 A | 11/1994 | Muffi et al. | |
| 5,374,936 A | 12/1994 | Feng | |
| 5,379,451 A | 1/1995 | Nakagoshi et al. | |
| 5,381,338 A | 1/1995 | Wysocki et al. | |
| 5,387,993 A | 2/1995 | Heller et al. | |
| 5,388,147 A | 2/1995 | Grimes | |
| 5,390,339 A | 2/1995 | Bruckert et al. | |
| 5,394,158 A | 2/1995 | Chia | |
| 5,396,227 A | 3/1995 | Carroll et al. | |
| 5,396,558 A | 3/1995 | Ishiguro et al. | |
| 5,398,190 A | 3/1995 | Wortham | |
| 5,406,614 A | 4/1995 | Hara | |
| 5,408,513 A | 4/1995 | Busch, Jr. et al. | |
| 5,408,519 A | 4/1995 | Pierce et al. | |
| 5,408,682 A | 4/1995 | Ranner et al. | |
| 5,412,726 A | 5/1995 | Nevoux et al. | |
| 5,418,537 A | 5/1995 | Bird | |
| 5,423,076 A | 6/1995 | Westergren et al. | |
| 5,432,841 A | 7/1995 | Kimer | |
| 5,434,789 A | 7/1995 | Fraker et al. | |
| 5,438,615 A | 8/1995 | Moen | |
| 5,440,621 A | 8/1995 | Castro | |
| 5,454,024 A | 9/1995 | Lebowitz | |
| 5,457,737 A | 10/1995 | Wen | |
| 5,461,390 A | 10/1995 | Hoshen | |
| 5,465,289 A | 11/1995 | Kennedy, Jr. | |
| 5,469,497 A | 11/1995 | Pierce et al. | |
| 5,470,233 A | 11/1995 | Fruchterman et al. | |
| 5,479,408 A | 12/1995 | Will | |
| 5,479,482 A | 12/1995 | Grimes | |
| 5,485,161 A | 1/1996 | Vaughn | |
| 5,485,163 A | 1/1996 | Singer | |
| 5,485,505 A | 1/1996 | Norman et al. | |
| 5,488,563 A | 1/1996 | Chazelle et al. | |
| 5,494,091 A | 2/1996 | Freeman et al. | |
| 5,497,149 A | 3/1996 | Fast | |
| 5,502,761 A | 3/1996 | Duncan et al. | |
| 5,506,893 A | 4/1996 | Buscher et al. | |
| 5,508,931 A | 4/1996 | Snider | |
| 5,513,243 A | 4/1996 | Kage | |
| 5,515,287 A | 5/1996 | Hakoyama et al. | |
| 5,519,403 A | 5/1996 | Bickley et al. | |
| 5,532,690 A | 7/1996 | Hertel | |
| 5,535,434 A | 7/1996 | Siddoway et al. | |
| 5,539,398 A | 7/1996 | Hall et al. | |
| 5,543,776 A | 8/1996 | L'Esperance et al. | |
| 5,552,772 A | 9/1996 | Janky et al. | |
| 5,555,286 A | 9/1996 | Tendler | |
| 5,568,119 A | 10/1996 | Schipper et al. | |
| 5,574,648 A | 11/1996 | Pilley | |
| 5,579,372 A | 11/1996 | Angstrom | |
| 5,588,009 A | 12/1996 | Will | |
| 5,592,535 A | 1/1997 | Klotz | |
| 5,604,486 A | 2/1997 | Lauro et al. | |
| 5,606,313 A | 2/1997 | Allen et al. | |
| 5,606,850 A | 3/1997 | Nakamura | |
| 5,610,815 A | 3/1997 | Gudat et al. | |
| 5,614,890 A | 3/1997 | Fox | |
| 5,615,116 A | 3/1997 | Gudat et al. | |
| 5,621,793 A | 4/1997 | Bednarek et al. | |
| 5,628,051 A | 5/1997 | Salin | |
| 5,628,600 A | 5/1997 | Pasquini | |
| 5,633,912 A | 5/1997 | Tsoi | |
| 5,682,600 A | 10/1997 | Salin | |
| 5,740,534 A | 4/1998 | Ayerst et al. | |
| 5,761,618 A | 6/1998 | Lynch et al. | |
| 5,767,795 A | 6/1998 | Schaphorst | |
| 5,768,509 A | 6/1998 | Gunluk | |
| 5,774,533 A | 6/1998 | Patel | |
| 5,787,357 A | 7/1998 | Salin | |
| 5,794,142 A | 8/1998 | Vanttila et al. | |
| 5,796,734 A | 8/1998 | Izawa et al. | |
| 5,797,094 A | 8/1998 | Houde et al. | |
| 5,797,096 A | 8/1998 | Lupien et al. | |
| 5,802,492 A | 9/1998 | DeLorme et al. | |
| 5,806,000 A | 9/1998 | Vo et al. | |
| 5,822,700 A | 10/1998 | Hult et al. | |
| 5,828,740 A | 10/1998 | Khue et al. | |
| 5,920,821 A | 7/1999 | Seazholtz et al. | |
| 5,930,701 A | 7/1999 | Skog | |
| 5,943,399 A | 8/1999 | Bannister et al. | |
| 5,946,629 A | 8/1999 | Sawyer et al. | |
| 5,946,630 A | 8/1999 | Willars | |
| 5,950,130 A | 9/1999 | Coursey | |
| 5,953,398 A | 9/1999 | Hill | |
| 5,974,054 A | 10/1999 | Couts et al. | |
| 5,978,685 A | 11/1999 | Laiho | |
| 5,987,323 A | 11/1999 | Huotari | |
| 5,998,111 A | 12/1999 | Abe | |
| 6,035,025 A | 3/2000 | Hanson | |
| 6,049,710 A | 4/2000 | Nilsson | |
| 6,055,413 A | 4/2000 | Morse | |
| 6,058,300 A | 5/2000 | Hanson | |
| 6,064,875 A | 5/2000 | Morgan | |
| 6,070,067 A | 5/2000 | Nguyen et al. | |
| 6,075,982 A | 6/2000 | Donovan et al. | |
| 6,081,508 A | 6/2000 | West et al. | |
| 6,101,378 A | 8/2000 | Barabash et al. | |
| 6,122,503 A | 9/2000 | Daly | |
| 6,122,520 A | 9/2000 | Want et al. | |
| 6,148,197 A | 11/2000 | Bridges et al. | |
| 6,148,198 A | 11/2000 | Anderson et al. | |
| 6,149,353 A | 11/2000 | Nilsson et al. | |
| 6,169,891 B1 | 1/2001 | Gorham et al. | |
| 6,173,181 B1 | 1/2001 | Losh | |
| 6,181,935 B1 | 1/2001 | Gossman et al. | |
| 6,188,752 B1 | 2/2001 | Lesley | |
| 6,188,911 B1 | 2/2001 | Wallentin | |
| 6,198,431 B1 | 3/2001 | Gibson | |
| 6,199,045 B1 | 3/2001 | Giniger et al. | |
| 6,205,330 B1 | 3/2001 | Winbladh | |
| 6,208,854 B1 | 3/2001 | Roberts et al. | |
| 6,208,870 B1 | 3/2001 | Lorello et al. | |
| 6,223,046 B1 | 4/2001 | Hamill-keays et al. | |
| 6,226,529 B1 | 5/2001 | Bruno et al. | |
| 6,249,680 B1 | 6/2001 | Wax et al. | |
| 6,249,744 B1 | 6/2001 | Morita | |
| 6,263,212 B1 | 7/2001 | Ross et al. | |
| 6,266,614 B1 | 7/2001 | Alumbaugh | |
| 6,289,373 B1 | 9/2001 | Dezonno | |
| 6,292,669 B1 | 9/2001 | Meuronen et al. | |
| 6,317,594 B1 | 11/2001 | Gossman et al. | |
| 6,327,479 B1 | 12/2001 | Mikkola | |
| 6,373,930 B1 | 4/2002 | McConnell et al. | |
| 6,529,722 B1 | 3/2003 | Heinrich | |
| 6,744,854 B2 | 6/2004 | Berrier et al. | |
| 6,744,858 B1 | 6/2004 | Ryan et al. | |
| 6,751,463 B1 * | 6/2004 | Lorello et al. | ................ 455/466 |
| 6,771,742 B2 | 8/2004 | McCalmont et al. | |
| 6,771,946 B1 | 8/2004 | Oyaski | |
| 6,775,356 B2 | 8/2004 | Salvucci et al. | |
| 6,888,927 B1 | 5/2005 | Cruickshank | |
| 6,922,565 B2 | 7/2005 | Rhodes et al. | |
| 7,450,935 B1 | 11/2008 | Link | |
| 7,693,511 B2 | 4/2010 | Bottrich | |
| 7,844,285 B2 * | 11/2010 | Lorello et al. | ................ 455/466 |
| 8,019,368 B2 * | 9/2011 | Lorello et al. | ................ 455/466 |
| 2002/0003345 A1 | 1/2002 | Stanly | |
| 2003/0122669 A1 | 7/2003 | Filippov | |
| 2003/0224840 A1 | 12/2003 | Frank | |
| 2004/0158371 A1 | 8/2004 | Iggulden | |

| | | |
|---|---|---|
| 2004/0198332 A1 | 10/2004 | Lundsgaard |
| 2004/0203692 A1 | 10/2004 | Schwinke |
| 2005/0009576 A1 | 1/2005 | Van Bosch |
| 2005/0080519 A1 | 4/2005 | Oesterling |
| 2005/0090236 A1 | 4/2005 | Schwinke |
| 2005/0107132 A1 | 5/2005 | Kamdar |
| 2005/0201357 A1 | 9/2005 | Poyhonen |
| 2005/0260994 A1 | 11/2005 | Losch |
| 2006/0007920 A1 | 1/2006 | Michel |
| 2006/0092023 A1 | 5/2006 | Hofbeck |

* cited by examiner

| E-mail (In Box) | | |
|---|---|---|
| From | Subject | Received |
| John Doe | Meeting tomorrow | 10/15/98 9:05AM |
| Mary Jane | Accounting report | 10/20/98 3:35PM |
| Weather | Local weather forecast | 10/21/98 9:40AM |
| Traffic | Local traffic report | 10/21/98 10:20AM |
| Broker | Stock quote ABC stock | 10/21/98 10:30AM |
| ..... | ..... | ..... |

FIG. 6

| E-mail (Information Service) | | |
|---|---|---|
| From | Subject | Received |
| Weather | Local weather forecast | 10/21/98  9:40AM |
| Traffic | Local traffic report | 10/21/98  10:20AM |
| Broker | Stock quote ABC stock | 10/21/98  10:30AM |
| ...... | ...... | ...... |

1020'  Weather
1030'  Traffic
1010'  Broker

FIG. 7

| E-mail (In Box) 1001 | | |
|---|---|---|
| From | Subject | Received |
| John Doe | Meeting tomorrow | 10/15/98 9:05AM |
| Mary Jane | Accounting report | 10/20/98 3:35PM |
| 1010 — Broker | Stock quote ABC stock | 10/21/98 9:30AM |
| 1020 — Weather | Local weather forecast | 10/21/98 9:40AM |
| 1010A — Broker | Stock quote ABC stock | 10/21/98 9:45AM |
| 1030 — Traffic | Local traffic report | 10/21/98 9:50AM |
| 1010B — Broker | Stock quote ABC stock | 10/21/98 10:00AM |
| 1010C — Broker | Stock quote ABC stock | 10/21/98 10:15AM |
| 1030A — Traffic | Local traffic report | 10/21/98 10:20AM |
| 1010D — Broker | Stock quote ABC stock | 10/21/98 10:30AM |
| ▫▫▫▫ | ▫▫▫▫ | ▫▫▫▫ |

FIG. 9 (Prior Art)

INTELLIGENT QUEUE FOR INFORMATION TELESERVICE MESSAGES WITH SUPERCEDING UPDATES

The present application is a continuation of U.S. application Ser. No. 12/926,122, entitled "Intelligent Queue for Information Teleservice Messages with Superceding Updates", filed on Oct. 27, 2010, now U.S. Pat. No. 8,019,368; which in turn claims priority from U.S. application Ser. No. 10/865,924, entitled "Intelligent Queue For Information Teleservice Messages With Superceding Updates", filed on Jun. 14, 2004, now U.S. Pat. No. 7,844,285; which in turn claims priority from U.S. application Ser. No. 09/411,240, entitled "Intelligent Queue For Information Teleservice Messages With Supercedinq Updates", filed Oct. 4, 1999, now U.S. Pat. No. 6,751,463, issued Jun. 15, 2004, the entirety of all three of which are expressly incorporated herein by reference.

BACKGROUND OF THE INVENTION

1. Field of the Invention

The present invention relates generally to communications networks. More particularly, the present invention relates to a method and apparatus for intelligent delivery and storage of various information service messages to a subscriber including short message service (SMS) messages, particularly in a wireless communications network.

2. Background of Related Art

We are now in what is called the information age. More than ever, the exchange of information, and the ability to do the same, has become an important technical necessity of modern society. With the introduction and now wide usage of the Internet, and the advances in telecommunications, a variety of means for exchanging information have proliferated to bring a great number of people together through the exchange of information.

One way in which information is exchanged is through short messages. A short message is typically a textual such as paging message, e-mail or a voice mail message passed to and/or from various types of communication devices, e.g., cellular telephone handsets, telephones or computers with appropriate modems. A variety of services have been introduced using SMS networks including, for example, integrated electronic mail and fax, integrated paging, interactive banking, and information services such as stock quotes, and airline schedule delivery.

FIG. 8 shows a general example of one such short message exchange network. In particular, in FIG. 8, a voice or text message is communicated between a first communication device (i.e., sender 806) and a second communication device (i.e., recipient 804). The sender 806 accesses a wide area network (WAN) such as the Internet or the Public Telephone Switching Network (PTSN). The short message from the sender 806 via gateway 805 is delivered to the recipient 804 via, e.g., a gateway 802 and a local area network (LAN) and/or wireless network 803.

Although the recipient 804 is shown as being a mobile phone handset, the recipient 804 may comprise, e.g., a computer device connected either through the LAN 803 or via a direct modem connection to the WAN (e.g., PTSN or the Internet) 801.

An example of a wireless short message exchange network is described in co-pending and co-owned U.S. patent application Ser. No. 09/322,929, filed Jun. 1, 1999 by the same inventors as herein entitled: "SHORT MESSAGE SERVICE NOTIFICATION IN MULTIPLE SERVICE CENTER SHORT MESSAGE SERVICE NETWORK", claiming priority from U.S. provisional application No. 60/105,774, filed Oct. 27, 1998, entitled: "PENDING MESSAGE NOTIFICATION SCHEME IN WIRELESS SYSTEM", both of which are explicitly incorporated herein by reference.

A well known example of a system which delivers short messages is an electronic mail system, commonly referred to as e-mail. E-mail enables a sender to exchange information with a recipient from their respective communication devices, e.g., typically two remotely located computer devices.

An SMS network typically includes one or more short message service center(s) (SMSC) which each provide a store-and-forward mechanism to provide guaranteed delivery of a short message to an intended subscriber. Using the store-and-forward mechanism, delivery of transmitted short messages is guaranteed to the supported subscribers whether or not the intended recipient is "on-line" or active because the transmitted short message is stored within the one SMSC assigned to service the particular recipient subscriber, and later delivered to the intended subscriber recipient from their assigned SMSC once the subscriber recipient again becomes available.

Thus, if a subscriber recipient is inactive when a short message is originally transmitted to them, the short message will be stored at the relevant SMSC servicing the particular subscriber and forwarded once the subscriber again becomes active.

Integrated e-mail and fax, integrated paging, and/or interactive banking, and/or audible information services are all typical services provided by typical SMS network service providers. For example, with integrated e-mail, e-mail messages may be sent to and received from a mobile handset 804 via the Internet, PTSN, and/or a wireless network, as appropriate.

Example audible information services typically available include weather reports, traffic information, entertainment (e.g., movie and concert) information, and/or financial information such as stock quotes, exchange rates, banking and brokerage services, etc. These audible information services are typically delivered using a short message service using, e.g., a voice message and/or e-mail message to the subscriber.

Many of the audible information services provide information which is periodically updated. For example, weather reports, stock quotes, traffic information, etc. may be updated by the sender sending a revised voice message and/or e-mail message to the subscriber, e.g., every hour, three times a day, etc. Because of the periodic updates, certain short messages (i.e., the old ones) might be thought to have a "shelf life" after which they become unreliable. Unfortunately, a recipient receives all short messages addressed to them, and in fact is guaranteed delivery of all messages—including the outdated ones, because of the conventional store-and-forward techniques. Thus, for example, after an extended absence, many superceded stale messages must be sifted through by the recipient before the most current message is retrieved and confirmed.

Oftentimes, the source of a particular short message is not known until the content is reviewed by the recipient, which is typically wasteful of time, particularly after an extended period of absence by the recipient.

For example, a subscriber who subscribes to a stock quote service may periodically receive updated short messages (e.g., e-mail) every, e.g., 15 minutes, 30 minutes, hour, 3 times a day, etc. This is exacerbated by a user who subscribes to more than one information services. Thus, during an extended absence in particular, the subscriber may receive numerous short messages from each of the information services most of which may be out of date by the time they are retrieved by the user.

FIG. 9 shows an exemplary "in-box" of a typical e-mail application program in which e-mail messages received by the subscriber are listed in a desired order, e.g., in the order of receipt, in alphabetical order according to the sender, or in alphabetical order according to the subject, etc.

In particular, several short messages 1010, 1020, 1010A, 1030, 10108, 1010C, 1030A and 1010D are shown in FIG. 9 in chronological order. Typically, a subscriber is interested only in the latest information message from any particular occasionally revised information service, e.g., 1020, 1010D and 1030A, but is nevertheless required to "scroll through" and/or delete earlier messages from the same sender to get to the latest message from that sender. This inconvenience is particularly acute with respect to voice messages, which are typically more difficult to "scroll" through. Moreover, the inconvenience may be exacerbated if the subscriber has not retrieved their short messages for a long period of time, e.g., because their mobile telephone has been inactive or off for a long period of time.

Short messages may be stored at a server location or at a mobile subscriber 804 of a SMS network, e.g., as described in the referenced co-pending application. The short messages are stored in a memory, often referred as a queue, either in the SMSC which services the subscriber or, after delivery, in the subscriber's receiving communication device, e.g., their mobile handset.

An exemplary conventional queue is shown in FIG. 10A.

In particular, a first in, first out (FIFO) queue 901 includes N+1 memory blocks, each of which can store all or a portion of a short message. The short messages may initially be stored starting from memory block, 0, with later received message being stored in a later memory block in the FIFO queue 901. Thus, the FIFO queue 901 in this example may be said to grow from memory block 0 in the direction of the memory block N.

The current message pointer 903 holds the location of the short message currently being accessed. A subscriber can typically "scroll" through their short messages in their queue 901 in either direction. For example, when the subscriber indicates that they desire to view the next short message by, e.g., pressing an appropriate key, the short message stored in the memory block i+1 will be accessed, and the value of the current message pointer 903 will change in the proper direction, e.g., from i to i+1. On the other hand, if the subscriber accesses a previous short message, memory block i−1 will be accessed, and the value of the current message pointer 903 will change, e.g., from i to i−1.

As another example, if a subscriber wants to access the short message stored in memory block 0, and if the current message being displayed is the $N^{th}$ short message (i.e., value of the pointer 903 is N) currently in their queue 901, the subscriber must typically scroll through or otherwise access as many as N short messages by, e.g., pressing an appropriate scroll button N times.

A circularly arranged queue 902 as shown in FIG. 10B provides an improvement over the FIFO queue 901 by providing a wrap-around feature. The circular queue 902 requires a maximum of N/2 scrolls to reach any particular short message from any particular starting point within the circular queue 902, as opposed to the FIFO queue 901 as shown in FIG. 10A which requires a maximum of N scrolls to reach an extreme short messages. Thus, for example, if the current value of a pointer 904 is N, and the subscriber wants to access the short message at memory block 0, then the subscriber need only scroll one time, i.e., only a single press of an appropriate button due to the wrap around scroll capability.

FIG. 11 illustrates a typical short message receipt process performed either by an SMSC or by a subscriber's receiver device.

In particular, as shown in step 1101 of FIG. 11, each newly received short message is appended to a short message queue associated with the receiving subscriber and with that type service, in the next available memory block, typically at the end of the queue as shown in step 1103.

A conventional SMSC may keep a message count corresponding to the number of short messages held by the SMSC for the relevant type short messages for later delivery to a particular subscriber, and increment the same every time a new short message of the relevant type is stored and added to the queue as shown in step 1102. For instance, a typical mobile handset of a receiving subscriber may similarly keep a message count corresponding to the number of short messages received by the handset, and similarly increment the count for that type short message every time a new short message is received.

The subscriber may typically delete any particular short message in the queue, typically by scrolling through the message queue to locate the particular short message to be deleted. Once a short message is deleted, the short messages in the queue are "shifted up" to fill the void created by the deletion, and the message count is decremented to update the new number of stored short messages.

In conventional SMSC networks thus far described, each newly received short message of relevant type is automatically appended to a queue for that type service, usually at the end of the relevant message queue.

Some short message service systems allow limited ability to prioritize a particular short message into a priority queue, which operates similarly for all messages with equal priority. Unfortunately, the conventional method of storage of short messages at the receiving subscriber's communication device (and/or at the SMSC before delivery) is disadvantageous in that the subscriber may be required to "scroll through" previous stale or obsolete messages from the same source (e.g., through several old weather reports or several old stock quotes) before accessing the most up-to-date short message from the relevant source.

Conventional SMSCs (or e-mail servers) do not take into account the above described potential multiplicity of short messages from particular information service provider, and thus deliver all short messages, including stale and/or obsolete short messages, when the subscriber again becomes available. Unfortunately, delivery of stale and/or obsolete short messages unnecessarily wastes bandwidth, and is quite inconvenient to the subscriber. Moreover, storage of stale and/or obsolete short messages tend to clutter and waste memory capacity of the relevant SMSCs, e-mail servers, subscriber computers, and/or subscriber computer and/or handsets.

Furthermore, conventional short message delivery and storage methods make it impractical to provide an efficient on-demand update of a particular short message. For instance, a subscriber may send a request to a particular service provider to provide a short message containing the latest update information, e.g., the latest quote of a particular stock. However, when delivered, the latest update short message is typically appended at the end of a potentially large queue including preceding short messages, requiring the subscriber to scroll through the earlier received short messages before access to the requested short message from that sender.

There is thus a need for an architecture and method for delivery and storage of messages in a short message exchange network which provides efficient use of memory in which the messages are stored, which does not require the subscriber to manually select and/or delete obsolete and/or stale messages, and/or which does not require unnecessary delivery by a servicing SMSC of obsolete and/or stale messages.

SUMMARY OF THE INVENTION

In accordance with the principles of the present invention, a message exchange network is provided for sending and receiving messages, including information service messages, which allow efficient use of memory space and on-demand updates of information without delivery and/or storage of obsolete and stale messages that are updated by being replaced by a newly received message. The message exchange network according to one aspect of the principles of the present invention comprises receiving at least one message intended for a subscriber of the network, determining whether each of the received messages is an information service message, locating any stored messages corresponding to the same information service, and overwriting any located messages from the same source with the newly received message if the newly received message is determined to be an appropriate information service message:

In accordance with another aspect of the principles of the present invention, a short message service center of an SMS network includes supercedingly updated information service short messages. A new short message intended for the subscriber is received into a storage queue. The new short message is determined to be an information service short message, and stored short messages are reviewed for any previously stored short message from the same information service. A queue control overwrites any located previously stored messages corresponding to the same information service.

In accordance with yet another aspect of the principles of the present invention, a mobile handset includes means for receiving a new message from the network, a storage queue for storing at least one message received from the network, means to determine whether the new message is an information service message, means to locate any previously stored messages corresponding to the same information service, and a queue control means to overwrite any located stored messages corresponding to the information service.

In accordance with another aspect of the principles of the present invention, an electronic mail application comprises means for determining whether a new message received by the computer is an information service message, means for locating from a storage queue of the computer any previously stored message corresponding to the same information service as the new message, and means for overwriting any located stored messages with corresponding to the same information service.

In addition, in accordance with the principles of the present invention, a method of sending, receiving and/or storing messages to and from a communication device in communication with a communications network is provided. A message queue stores at least one message intended for a particular communication device. A new message is received, and it is determined whether the new message is an information service message. If the new message is an information service message, any previously stored messages that correspond to the same information service are replaced with the new message.

BRIEF DESCRIPTION OF THE DRAWINGS

Features and advantages of the present invention will become apparent to those skilled in the art from the following description with reference to the drawings, in which:

FIG. 6 shows an illustrative example of an in-box display of an electronic mail application, in accordance with the principles of the present invention.

FIG. 7 shows another illustrative example of an in-box display of an electronic mail application, in accordance with the principles of the present invention.

FIG. 9 shows an example of an in-box display of a conventional electronic mail application.

DETAILED DESCRIPTION OF PREFERRED EMBODIMENTS

The present invention provides a method and apparatus for conveniently and efficiently receiving, storing and/or delivering short messages in a message exchange communications network from, e.g., information service providers. Although the following description is given with reference to a preferred embodiment in which the invention is practiced in a short message service network, particularly in a mobile communication network, it would be apparent to one of ordinary skill that the principles of the present invention are equally applicable to any other types of communications networks in which messages are exchanged and stored by subscribers of the network.

Figure 8:
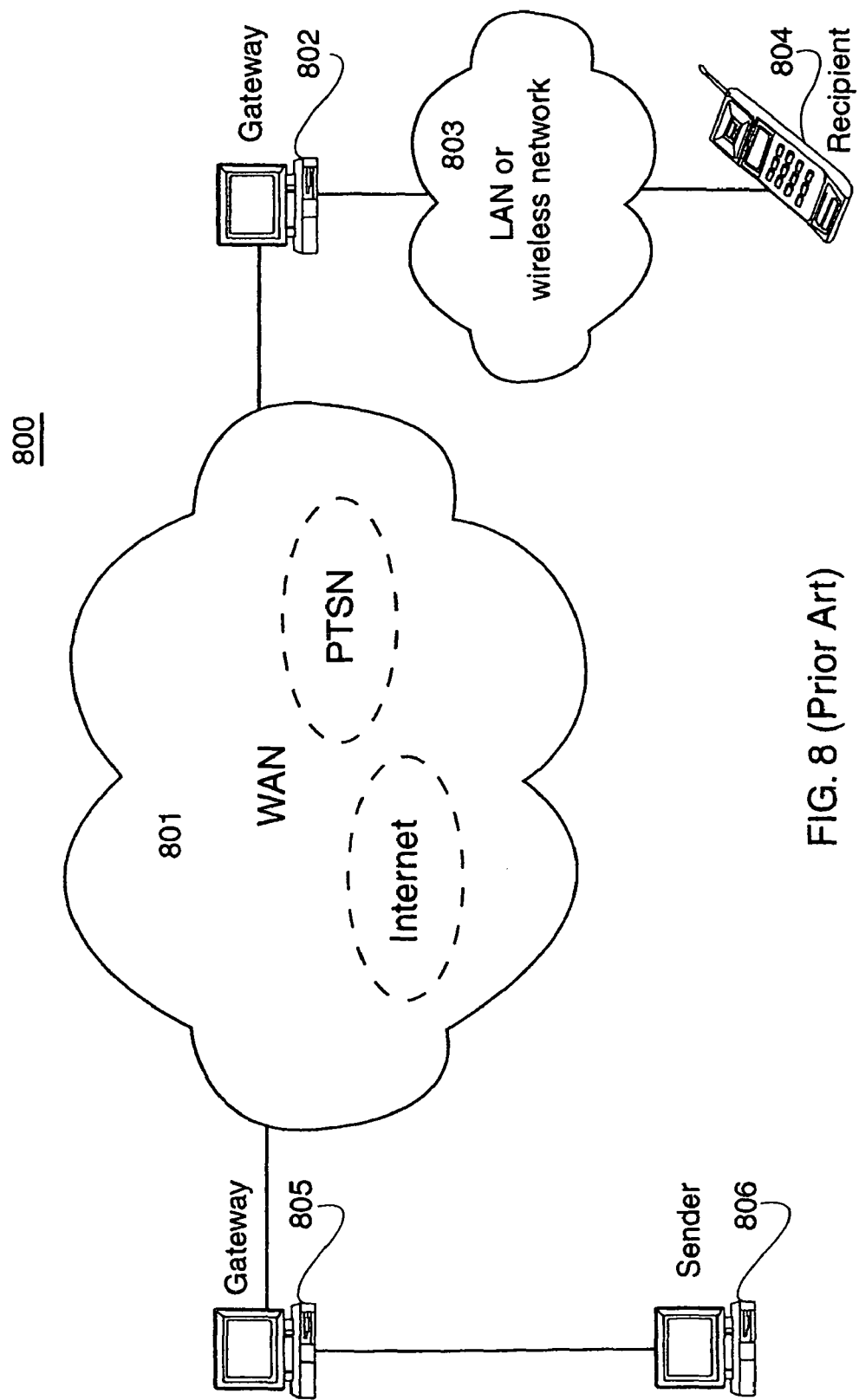
FIG. 8 depicts a conventional communications network.

The subscriber receives a variety of messages, either as an electronic mail message delivered to the subscriber's computer connected to a communications network, e.g., shown in FIG. 8, or as a short message delivered to their mobile handset 804 from any of a variety of sources, e.g., the sender 806, through a network 801. The sender can be another subscriber, a network service provider (e.g., a network account manager to collect network subscription or usage fee), or an information service provider.

An information service provider delivers information, e.g., stock quotes, weather forecast, or traffic information, to a subscriber by sending an information service message. The term "information service message" as used herein refers to a message that contains information that is updateable, such that information contained in a newer message updates information contained in any previous messages by replacement thereof, and renders the information contained in the previous message(s) stale, obsolete, and/or otherwise less relevant.

Figure 1:
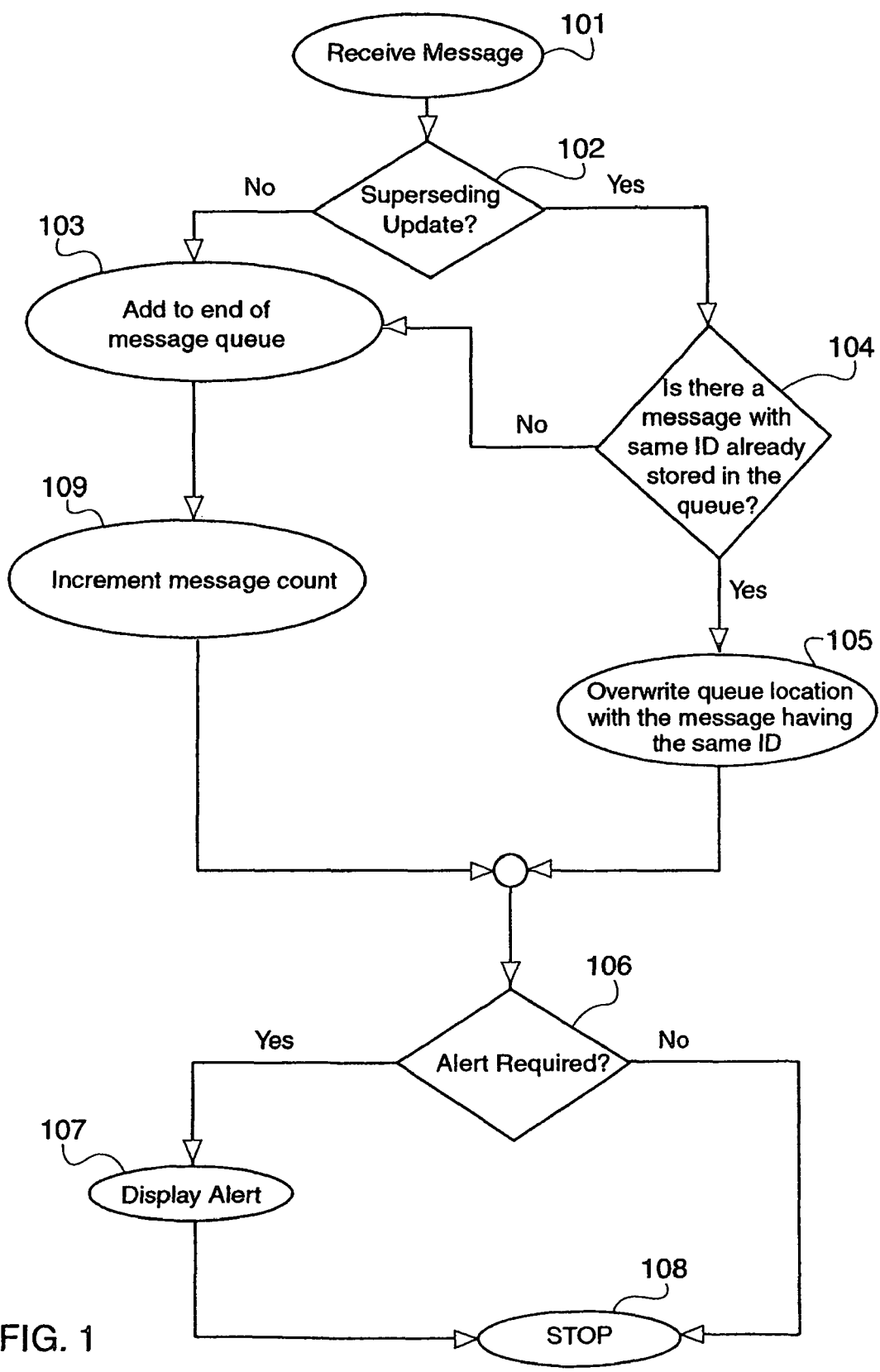
FIG. 1 shows a flow chart depicting an illustrative example of a process of receiving and storing a message, in accordance with the principles of the present invention.

FIG. 1 shows a flow chart depicting an illustrative example of a process of receiving and storing a message, in accordance with the principles of the present invention. The inventive process is illustrated by using an example of a mobile handset as the recipient of a new message. However, it is to be understood by and apparent to one of ordinary skill that the recipient may also be an SMSC, an e-mail server, or an e-mail client application, all of which receive and store various messages either for subsequent access or forwarding. The following description with regard to FIG. 1, therefore, would be equally applicable if the "mobile handset" is substituted by any message recipient entity, e.g., an SMSC, an e-mail server, or an e-mail client application that stores received messages.

Figure 11:
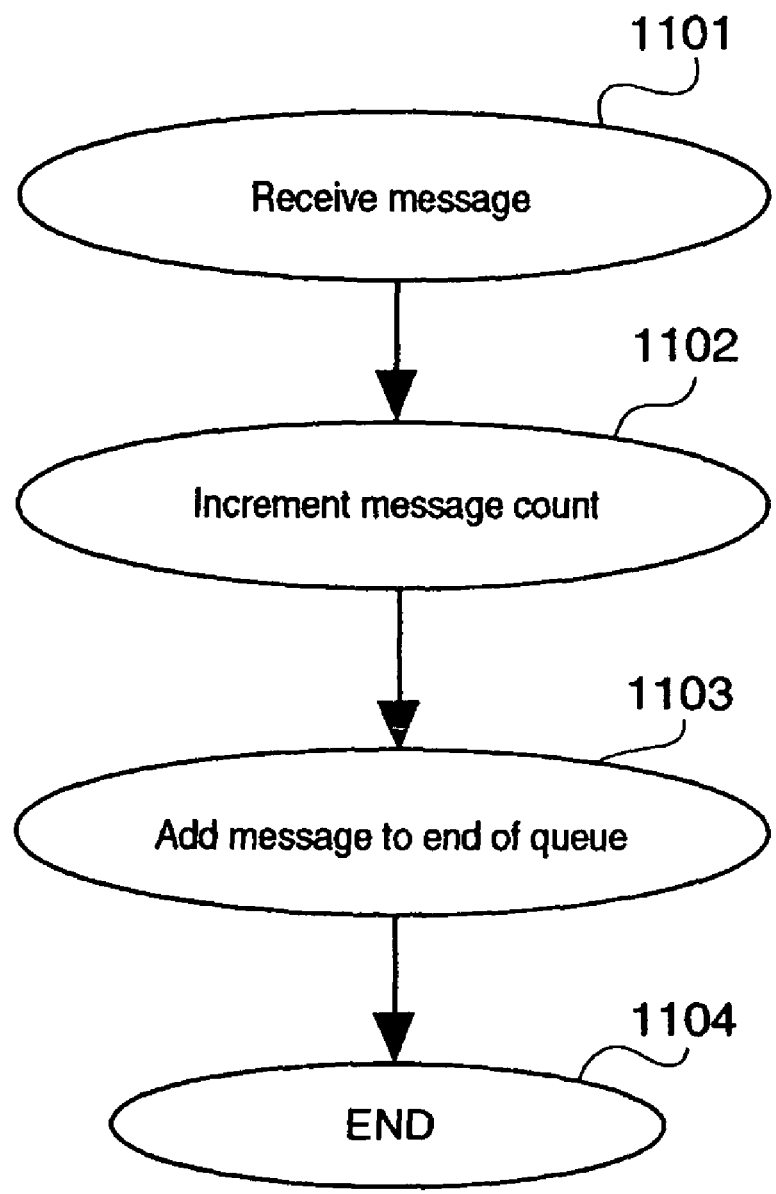
FIG. 11 shows a conventional process of receiving and storing a short message from an information service, at the end of a conventional queue.

In contrast to the prior art process illustrated in FIG. 11, which automatically added new messages to the end of a message storage queue, in accordance with the principles of the present invention, some new messages may overwrite older messages from a same source.

In step 101 of FIG. 1, a new message is received by a mobile handset from an SMSC.

In step 102, the recipient determines whether the newly received message is of the type that requires a superceding update, e.g., an information service message. The present invention contemplates a variety of ways, as will be discussed, in which the determination in step 102 may be made by the message recipient, e.g., a subscriber's mobile handset, an SMSC, an e-mail server, or an e-mail client application If it is determined that the newly received message does not require superceding updates, then the message stored in a similar manner previously described with regard to a conventional message queue, i.e., the message is appended at the end of the message queue and the message count is incremented as shown in steps 103 and 109.

On the other hand, if the message is determined to be of the type that requires superceding updating, then a message previously stored in the message queue, and from the same message source is searched in step 104. If a previously stored message from the same source is found, the found message is replaced by the newly received message in step 105.

Once the newly received message is stored, either by append or replacement methods, the receipt of the new message is announced as appropriate in steps 106 to 108.

Each of the above steps of FIG. 1 will now be explained in more detail with reference to the FIGS. 2A-5B.

Figure 2A:
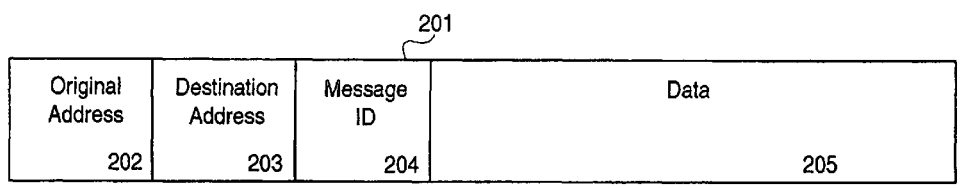
FIG. 2A shows an illustrative example of the format of a short message, in accordance with the principles of the present invention.

FIG. 2A shows a simple exemplary format of a short message 201. For the sake of brevity and clarity, the only those relevant portions of the short message 201, which are necessary to explain the principles of the present invention is shown. The short message 201 may include fields or information other than what is shown in FIG. 2A, e.g., intermediate origination and destination addresses, SMS teleservice identifier, CRC information, etc., and/or may have fields or information in order different than shown in FIG. 2A. The exemplary message format is intended for illustration purposes only, and is not (and should not be construed as) the only possible format.

As shown in FIG. 2A, the short message 201 may include, inter alia, the origination address 202, the destination address 203, the message identifier 204, and the data payload 205 that contains the text or the content of the message.

The destination address 203 and the origination address 202 identify the addresses of the recipient and the sender of the short message 201, respectively.

The data 205 includes the short messages being delivered, and may further include teleservice specific information, such as, for example, priority information, language information, security information, and the number of pending voice mail messages and the like.

The message Identifier 204 distinguishes a particular message from other message(s) intended for the same subscriber. In a conventional SMS network, the message identifier is typically generated by the SMSC for each message it receives for a particular subscriber by simply assigning the next unused number from a range of numbers, e.g., 0 through 4095.

Figure 5A:
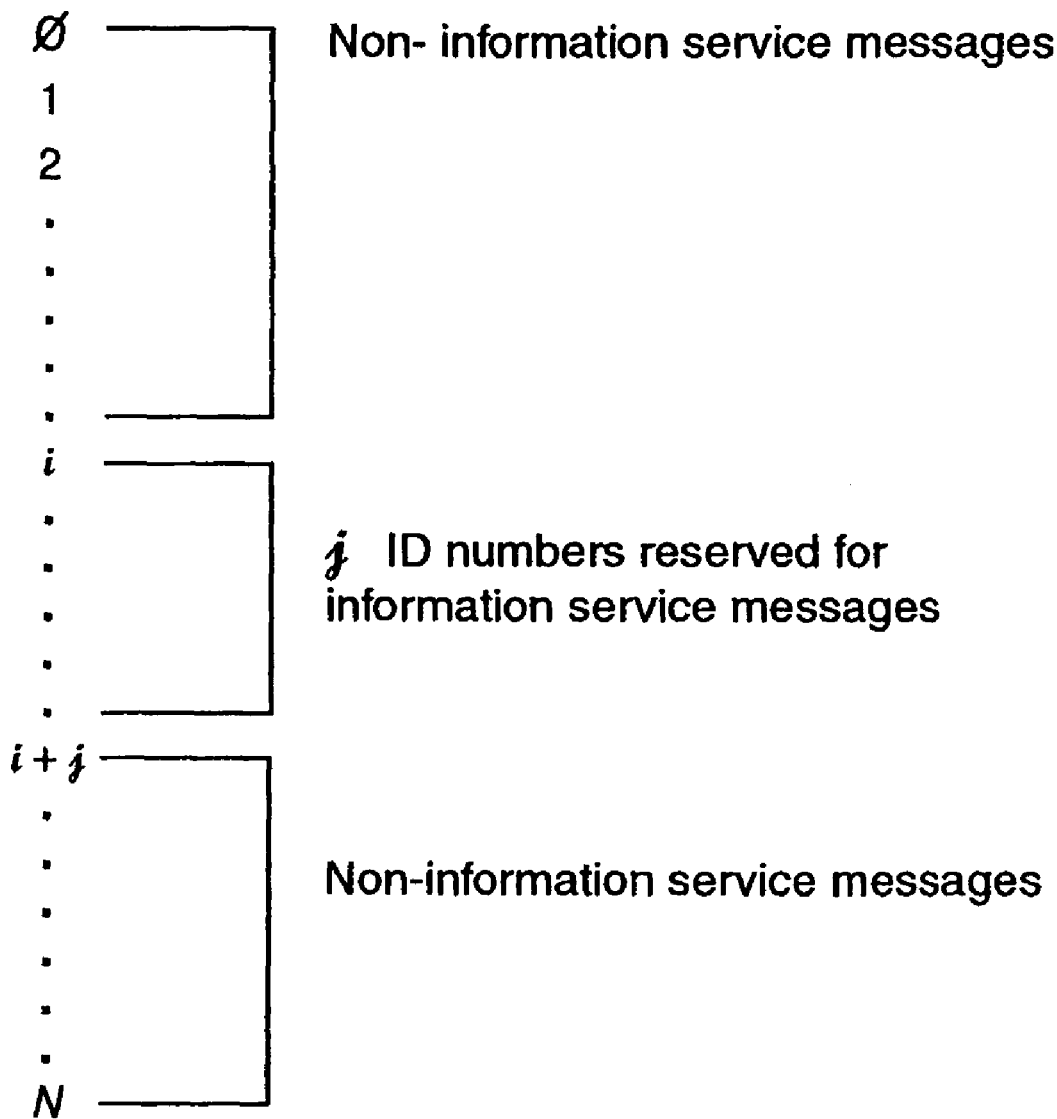
FIG. 5A shows an illustrative example of the reservation of a message Identifier for information service messages, in accordance with a preferred embodiment of the present invention.

In a preferred embodiment of the present invention, the message identifier 204 is used to determine if a particular message received is an information service message that is meant to supercedingly replace an existing message already stored in a message queue, e.g., a new price quote for a stock, or a new weather forecast update, etc. As shown in FIG. 5A, a block of a range of numbers, i to i+j may be set aside for storing information service messages containing information that is periodically and/or supercedingly updated, and the remaining range of available N−1 numbers are for storing type of messages other than the information service messages.

In a preferred embodiment of the present application, in step 102 of FIG. 1, the mobile handset (or any other aforementioned message recipient) examines the message identifier 204 to see if it is one of the message identifiers reserved for information service messages by determining if the message identifier is within the range of the block of identifiers, i.e., i to i+j, as shown in FIG. 5A.

The message identifier may be assigned, for example, by the SMSC, which tests a received message to determine if it is an information service message and of which service by, for example, looking up the origination address from a look up table that lists various information service providers and their network addresses or by searching the text of the message for a test string, e.g., "weather", "traffic" or "stock exchange", and the like.

The message identifier may alternatively be assigned by an information service provider, who may interrogate the SMS network for the message identifier reserved for the type of service that he provides.

Yet another alternative may be to allow the subscriber to assign a particular reserved message identifier to an information service. The subscriber notifies the information service provider of his selection of message identifier for the provider. The service provider would then send all future messages to the subscriber using the selected message identifier.

Regardless of however a message identifier is assigned to a particular information service provider, once assignment is made, the one to one relationship between the network address of the information service provider and the corresponding message identifier makes it possible to identify one given the other. A record of the relationship for all information service providers and the respective message identifier is kept at the mobile handset, at the SMSC, or any other SMS network elements, e.g., a home location register (HLR), a visitor location register (VLR) and/or a mobile service center (MSC), capable of supplying the record to any other network elements that request the information. The record may be kept, for example, in a form of a look-up table.

Alternatively, the origination address 202 or the text of the message 205 rather than the message identifier 204 may be used to determine whether a received message is an information service message type by looking up a table or by searching for a test string as previously described above.

Figure 2B:
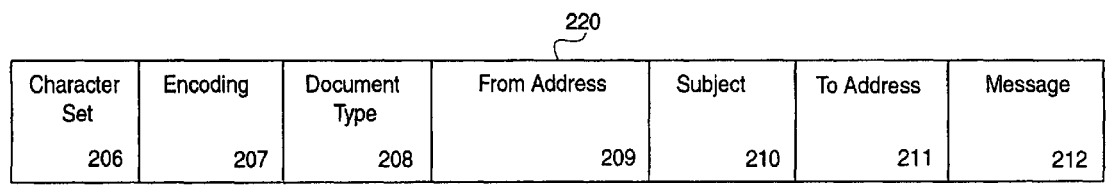
FIG. 2B shows an illustrative example of the format of an electronic mail message, in accordance with the principles of the present invention.

FIG. 2B shows an illustrative example of the format of an electronic mail message as defined by electronic mail protocols, e.g., the simple mail transport protocol (SMTP) or the X.400 protocol. For the sake of brevity and clarity, the only those relevant portions of the electronic mail message 220, which are necessary to explain the principles of the present invention is shown. The electronic mail message 220 may include fields or information other than what is shown in FIG. 2B, e.g., reply to address, server or sender name, etc., and/or may have fields or information in order different than shown in FIG. 2B. The exemplary message format is intended for illustration purposes only, and is not (and should not be construed as) the only possible format.

As shown in FIG. 2B, the electronic mail message 220 may include, inter alia, the character set 206, the encoding 207, the document type 208, the from address 209, the subject 210, the to address 211 and the message text 212.

The character set 206 defines the character set used for a message, e.g., western (ISO-8859-1) which is usually the default set or the Korean (euc-kr) set, etc. The encoding 207 specifies the content-transfer-encoding type of a message, e.g., 8-bit, quoted-printable, or the base64 encoding. The document type specifies the type of the document the message is in, e.g., text or HTML. The from address 209 specifies the address of the sender of the message. The subject 210 sets the subject of the message. The to address 211 specifies the address of the recipient of the message. The message 212 contains the body or the text of the message.

Any one, or a combination, of from address 209, the subject 211 or the message 212 may used to determine if a particular message received is an information service message. For example, an e-mail application client may use the from address 209 to determine whether the sender of the message is a information service provider, and use the information to replace a previous e-mail message from the same service provider. Alternatively, the subject 211 and/or the message 212 may be searched for a test string, e.g., "weather", "traffic" or "stock exchange", and the like.

In a preferred embodiment of the present invention, the e-mail client application creates and maintains a database of information service providers and their e-mail addresses, and thus is able, in step 102, to determine if the newly received message is an information service message by looking up the from address 209 from the database.

Once the determination that the newly received message is an information service message, then in step 104, the mobile handset examines its memory to determine if there is already stored a message having the same message identifier 204 as the newly received message. The e-mail client application may, in step 104, search, in the "in-box" message storage area, a previously stored message having the same from address 209 as the newly received e-mail message. The e-mail client application may examine the subject 210 and/or message 212 if necessary to distinguish between several messages having the same from address, if for example, several services are offered by the same provider (with the same e-mail address).

Alternatively, an e-mail client application may request the information service providers to include a unique identifier, e.g., a number or a text string, in the subject field, for example, to serve as a message identifier. The message identifier would then be used by an e-mail client application in a manner identical to the way in which a mobile handset uses the message identifier 204 to locate supercedingly updateable messages, both the updating and the updated.

Figure 5B:
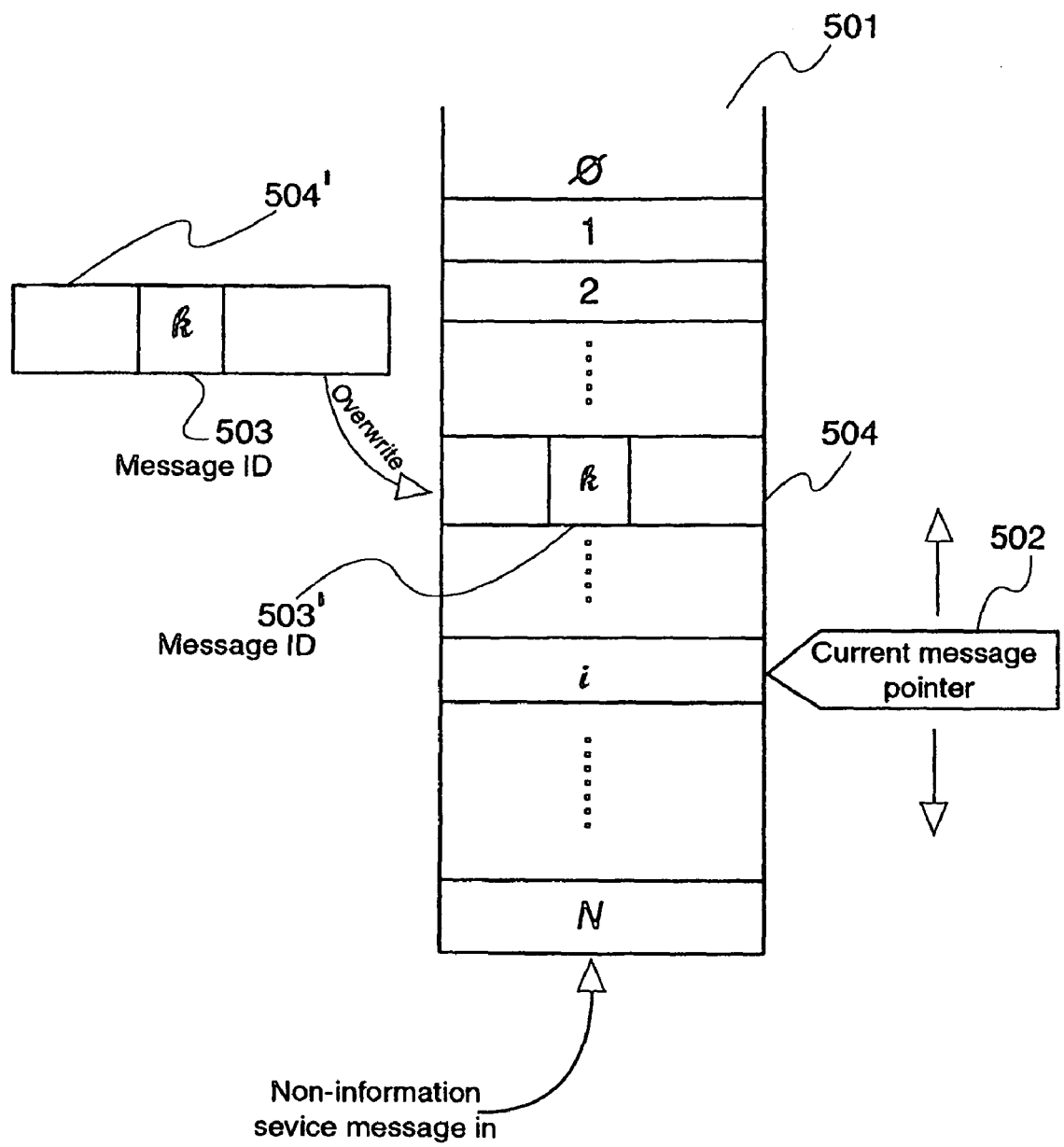
FIG. 5B shows an exemplary arrangement of a message storage queue, in accordance with one embodiment of the present invention.

In step 105, the previously stored message with the same message identifier, if found in step 104, is overwritten with the newly received message, i.e., the newly received message is stored in the same memory block as the memory block in which the previously was stored, supplanting the now stale and obsolete information in the previous message with the updated latest information contained in the newly received message. FIG. 5B shows an illustrative exemplar overwriting of a previously stored message 504 having a message identifier 503' being a k by a newly received message 504' also having k as its message identifier 503. The searching for a match between message identifiers of the newly received message 504' and messages already stored in the message queue 501 can be implemented by hardware comparators well known in the art to compare the particular bits corresponding to the message identifier fields 503 and 503', or the comparison may be done by a software routine.

Figure 5C:
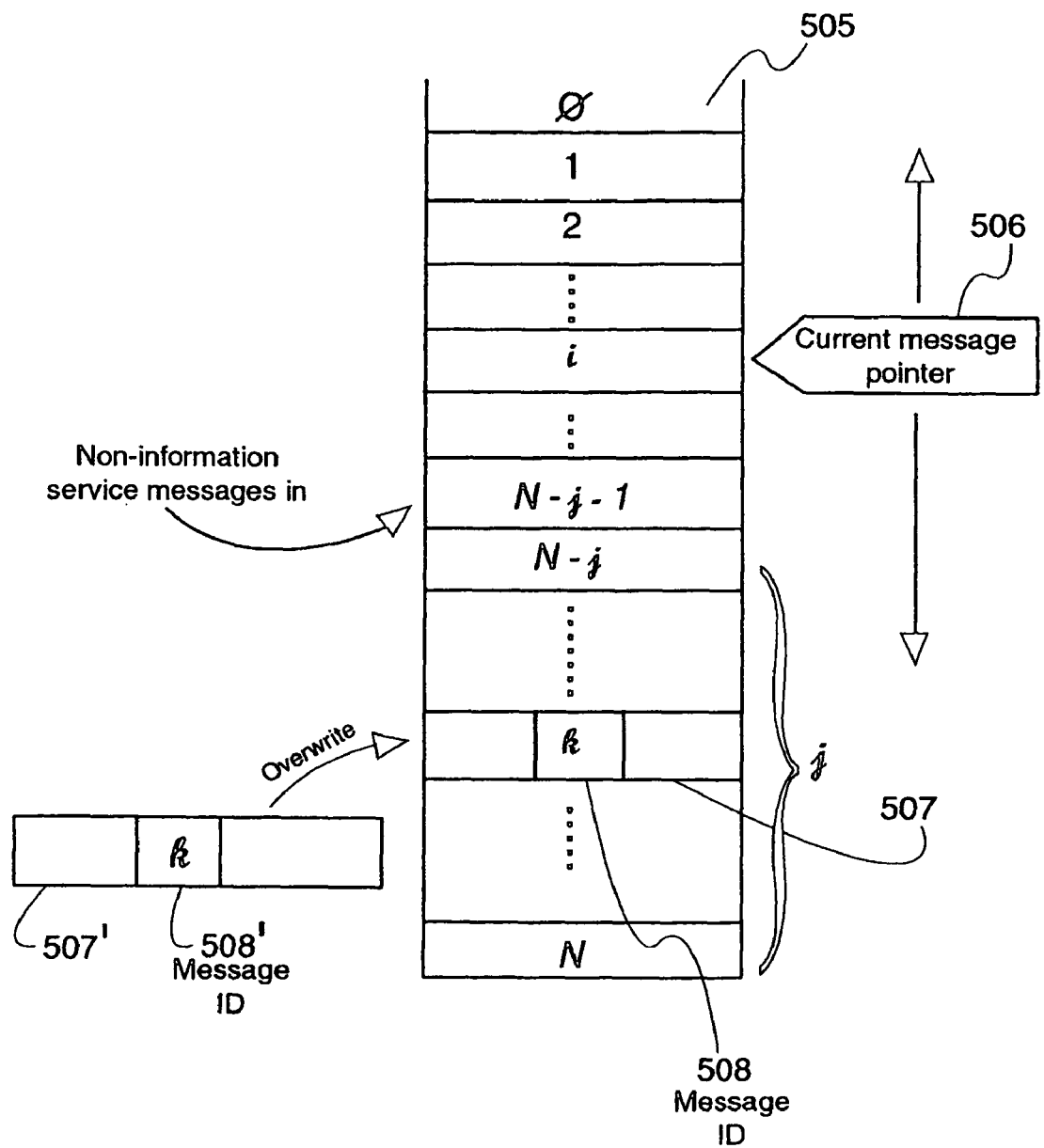
FIG. 5C shows another exemplary arrangement of a message storage queue, in accordance with another embodiment of the present invention.

FIG. 5C shows an another exemplar queue arrangement in accordance with an embodiment of the present invention. In this example, a plurality of memory blocks, e.g., blocks N−j to N, of a size that is equal to the size of the block of memory identifiers reserved as shown in FIG. 5A, is set aside for storing information service messages exclusively. In this embodiment, the time required for searching for a match in message identifiers may be shortened with respect to the embodiment shown in FIG. 5B, because the messages in the set aside block j need be searched. The rest of the memory locations, i.e., 0 to N−j−1, stores non-information service messages, and grows towards N−j−1 as previously described with regard to FIG. 9.

It is to be understood that although not shown in FIGS. 5B and 5C for simplicity and brevity, the messages queues described above in FIGS. 5B and 5C can be made to incorporate the wrap-around feature as previously described with regard to FIG. 9.

Figure 10B:
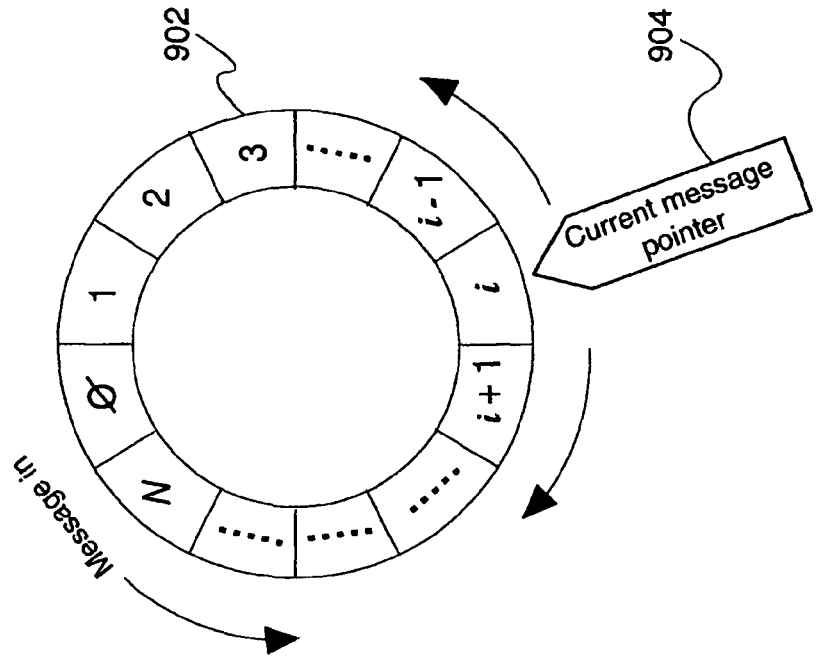
FIG. 10B shows a conventional circular message storage queues.
Figure 10A:
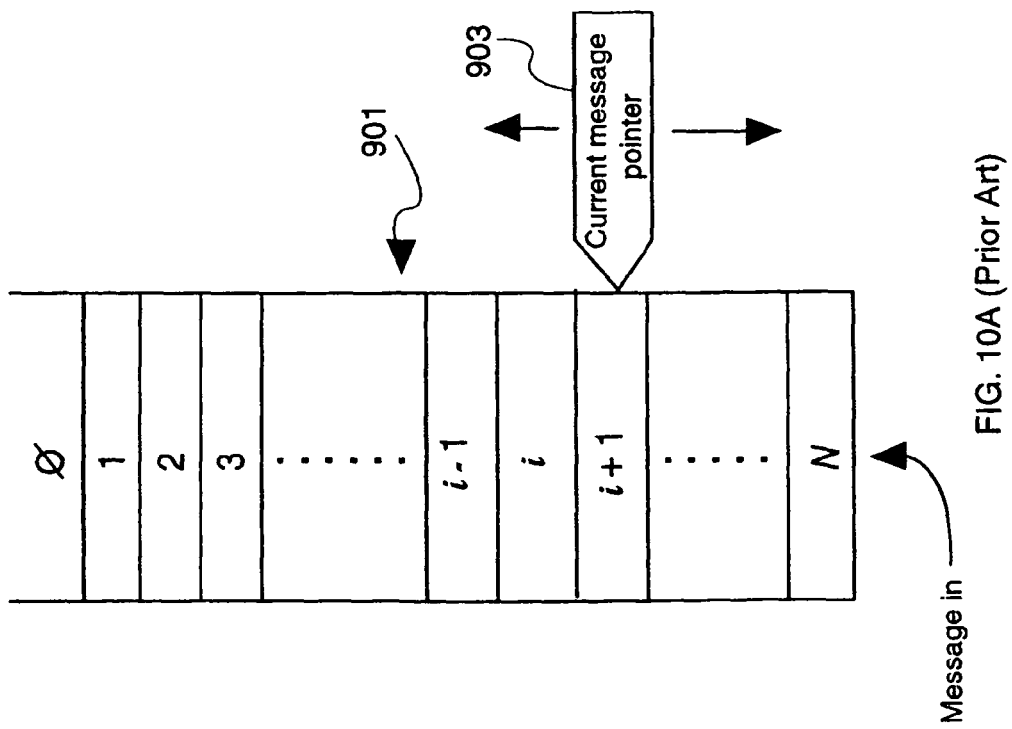
FIG. 10A shows a conventional linear FIFO type message storage queue.

FIG. 6 shows an illustrative exemplar in-box of an e-mail client application implementing the principles of the present invention. In contrast to the prior art in-box shown in FIG. 10, the in-box according to the principles of the present invention as shown in FIG. 6 displays only one message per a particular information service. The e-mail messages 1020', 1030', and 1010' are the most recently received messages in each respective information service, and thus contain the latest and the newest information. The messages 1020', 1030' and 1010' of FIG. 6 correspond to messages 1020, 1030A and 1010D shown in FIG. 10. The in-box of FIG. 6 does not include the messages 1010, 1010A, 10108, 1010C and 1030 of FIG. 10 which are obsolete and stale.

FIG. 7 illustrates an another embodiment of the present invention in Which the e-mail client application provides a separate in-box exclusively for storing updateable information service messages.

If it was determined in step 102 that the newly received message is not an information service message or if no previous message to be replaced by the newly received message was located in step 104, the newly received message is appended to the end of the message queue in steps 103 and 109 as previously described in connection with FIG. 11.

The present invention further envisions that a subscriber selectable feature can be provided to alert the subscriber in the event of receipt of message(s) of particular import or interest. Thus, in step 106, a determination is made if the newly received message requires alerting of the user, and if so determined, an alert, i.e., flashing message on the display of the handset or the computer, or an audible sound, in step 107.

Figure 3:
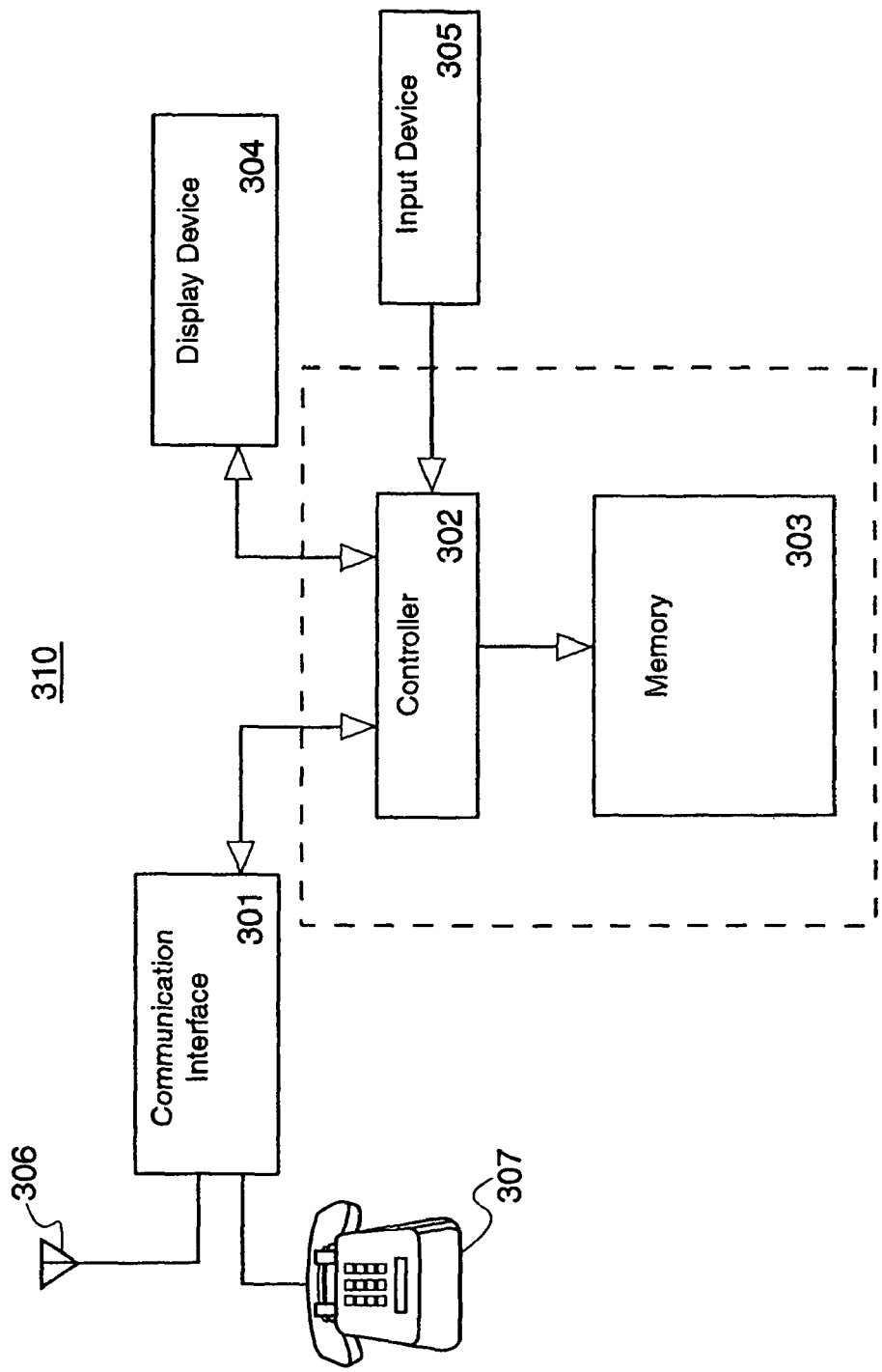
FIG. 3 shows relevant portions of an illustrative example of subscriber communications device, in accordance with the principles of the present invention.

FIG. 3 shows an illustrative example of the relevant portions of a subscriber communications device, e.g., a communications ready computer or a mobile handset. The communications device 310 may include one or more communication interfaces 301 to communicate with the communications network 800 (FIG. 8) through a wired connection 307, e.g., through a LAN or a modem, etc, or via a wireless connection 306. The communications device may further include a controller 302 that controls the communications, e.g., sending and receiving messages between the communications device 310 and the communications network 800, via the interface 301. The controller 302 may also control the storage of message(s) in memory 303 and retrieval of message(s) f from memory 303 for display at a display device 304, e.g., a LCD screen. The communications device 310 may also include an input device 305 from which a subscriber composes and inputs messages for sending, and/or indicate a desired selection from menu items or from messages stored in the memory 303.

The controller 302 may be in the form of any conventional microcontroller, microprocessor, or the like, and may implement the above control functions and all of the processes of the present invention via hardware and/or software implementation. In a preferred embodiment of the present invention, the above control functions are implemented by appropriate software stored either in an internal memory of the controller 302 or in the memory 303. The control software is re-configurable/updateable via the communication interface 301 by a network administrator for easy accommodation of upgrade/update of the network.

It can be readily appreciated that the above described principles of the present invention may be implemented in message queues of message servers, e.g., an SMSC or an e-mail server, etc., without undue experiments or difficulties, particularly with the following example of an SMSC in accordance with the principles of the present invention.

Figure 4:
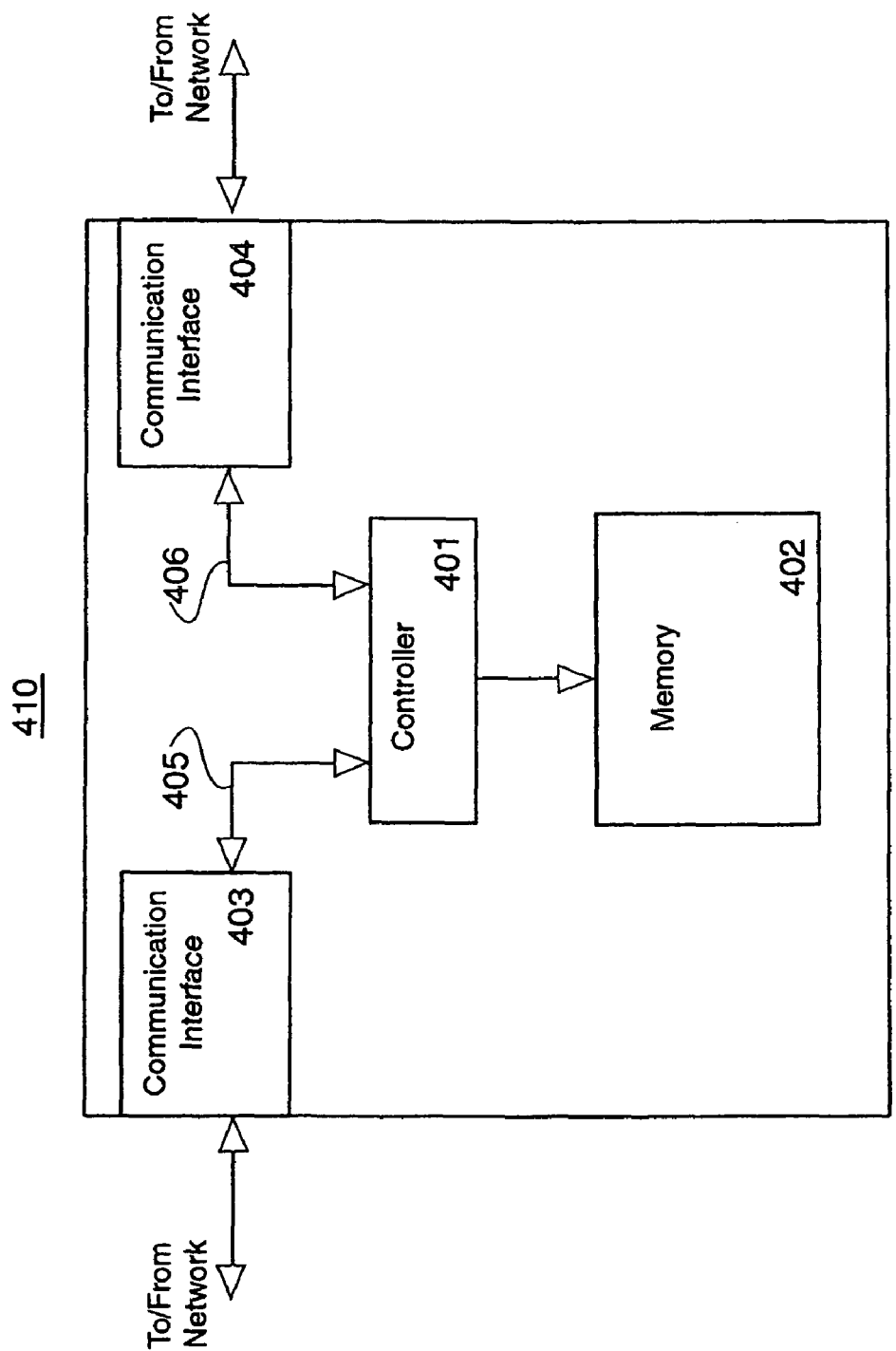
FIG. 4 shows relevant portions of an illustrative example of short message service center, in accordance with the principles of the present invention.

For example, FIG. 4 shows an illustrative example of the relevant portions of an SMSC, in accordance with the principle of the present invention. The SMSC 410 may include one or more communication interfaces, e.g., communication interfaces 403 and 404, to communicate with the network 800, and to send and receive messages to and from the network 800.

The SMSC 410 may further include a controller 401 that controls the communications between the SMSC 410 and the network 800 via the interfaces 403 and 404, the storage and retrieval of short message(s) in memory 401, and receipt and delivery of short messages to and from the network 800.

The controller 410 may be in the form of any conventional microcontroller, microprocessor, or the like, and may implement the above control functions and all of the processes of the present invention via hardware and/or software implementation. In a preferred embodiment of the present invention, the above control functions are implemented by appropriate software residing either in an internal memory of the controller 410 or in the memory 402. The control software is re-configurable/updateable via the interfaces 403 or 404 by a network administrator for easy accommodation of upgrade/update of the network.

Figure 5D:
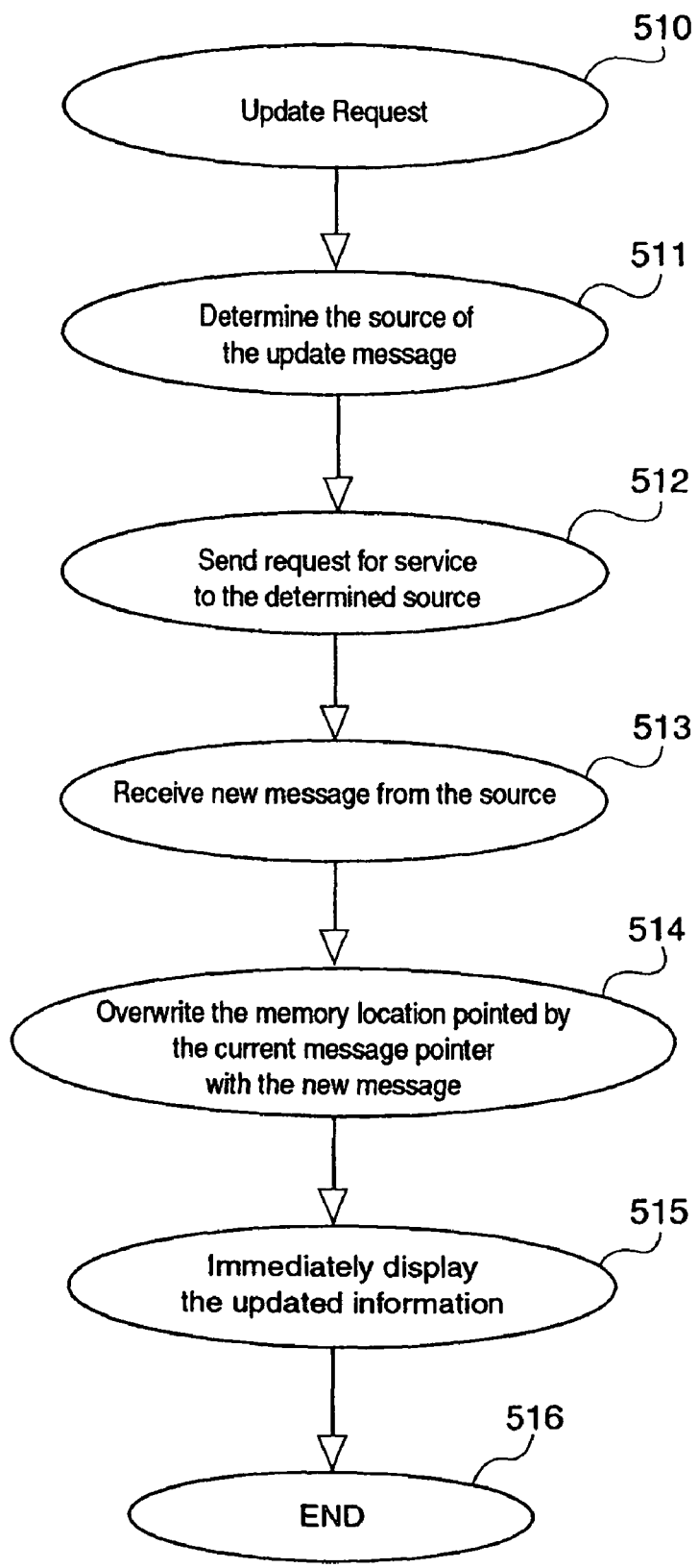
FIG. 5D shows a flow chart depicting an exemplary process for on-demand update of an information service message, in accordance with the principles of the present invention.

FIG. 5D shows an illustrative flow chart of an on-demand update of an information service message. Although an example of a short message service network is described in the following description, it is to be understood that the Same may be implemented in an e-mail network or any other message exchange network. In step 510, a subscriber requests an update of an information pertaining to an information service message currently being viewed by pressing a key, e.g., an "update" key, in the input device 305 (FIG. 3). In step 511, the subscriber communications device 310, or the controller 302 thereof, determines the address of the source (the information service provider) of the information contained in the message by examining the message identifier of the message being pointed by the current message pointer 502 or 506 (FIGS. 5B and 5C). The address of the source of information may be determined by looking up the message identifier in the lookup table containing address of information service providers and their respective message identifiers as previously described.

Once the address of the source of the information is ascertained, the communications device 310 sends a request for service to the information service provider having the address, in step 512. The request may be in the form of a mobile originated short message as described in the previously identified co-pending application. If the particular information service provider is capable of providing an on-demand update service, the information service provider sends a message that contains the requested updated information. The mobile handset receives the newly sent message from the information service provider in step 513, and, in step 514, replaces (overwrites) the message being pointed by the current message pointer 502 or 506.

In step 515, because the new message is now being pointed by the current message pointer 502 or 506, the message is immediately displayed on the display 304, saving the subscriber from having to scroll through other messages in order to view the requested updated message.

An alert may be made (either by displaying a flashing message or by an audible beep, etc.) to notify the subscriber of the completion of the requested update.

If the particular information service provider is incapable of responding to a on-demand request for update, the subscriber is notified of the inability to fulfill the request. For example, the handset may be programmed with a timer to "time out" after a predetermined time period without a response from the information service provider, and alert the subscriber of the failure.

An another example of a useful feature of the on-demand updating described above may be a provision of a running balance or call charge information after completion of a call or a transaction.

For example, a request for update can be generated by the handset automatically after each completion of a call, e.g., a voice call, or any other transaction, e.g., sending and receiving of messages, and sent to the network entity that keeps track of subscriber accounts. Thus, the subscriber may be able to instantly view such information as the duration of the last call, a running total usage time. This feature would be particularly useful to update a running balance of a pre-paid account after each use of the network service by the pre-paid account holder. A pre-paid account provides a predetermined amount of usage for which the subscriber pays in advance, and fees for each instances of usage by the subscriber is deducted from the predetermined pre-paid amount. Thus, information about the remaining balance in the pre-paid account after each usage is important and useful for the subscriber who may want to replenish the account in order to avoid possible interruption of service during an important call due to lack of available funds.

It can be appreciated that the above described architectures and methods for receipt, delivery and storage of messages in a message exchange network allows replaceable and/or on-demand update of information service messages while providing efficient use of message storage capacity, while avoiding the annoyance and inconvenience to the subscriber in having to scroll through numerous stale and/or obsolete messages to view the most current up-to-date message and having to manually select and/or delete obsolete and/or stale messages, and while avoiding unnecessary deliveries of the obsolete and stale Messages by message centers.

While the invention has been described with reference to the exemplary embodiments thereof, those skilled in the art will be able to make various modifications to the described embodiments of the invention without departing from the true spirit and scope of the invention. For example, any apparatus or method of the preceding description herein would be equally applicable if practiced with or implemented by any one of a mobile handset, an e-mail client application, an SMSC, an e-mail server or any other equivalent mechanisms, and such substitutions would be within such modifications that do not depart from the true spirit and scope of the present invention.

What is claimed is:

1. A Short Message Service Center (SMSC) to overwrite a digital message associated with a wireless device, comprising:
    a receiver, at a Short Message Service Center (SMSC), to receive a first digital message associated with a wireless device and a subsequently received second digital message associated with said wireless device;
    a determiner, at said SMSC, to determine that said first digital message stored in a message queue should be overwritten with said second digital message; and
    a controller, at said SMSC, to overwrite said first digital message with said second digital message if said determiner positively determines that said first digital message should be overwritten with said second digital message.

2. The Short Message Service Center (SMSC) to overwrite a digital message associated with a wireless device according to claim 1, wherein:
    said determiner determines that said first digital message stored in said message queue should be overwritten with said second digital message based on a positive match between a first message identifier associated with said first digital message and a second message identifier associated with said second digital message.

3. The Short Message Service Center (SMSC) to overwrite a digital message associated with a wireless device according to claim 2, wherein:
    said first message identifier is a reserved message identifier identifying said first digital message as being overwritable.

4. The Short Message Service Center (SMSC) to overwrite a digital message associated with a wireless device according to claim 1, wherein:
    said message identifier is assigned to a particular information service provider.

5. The Short Message Service Center (SMSC) to overwrite a digital message associated with a wireless device according to claim 1, wherein:
    said first digital message and said second digital message comprise respective origination addresses.

6. The Short Message Service Center (SMSC) to overwrite a digital message associated with a wireless device according to claim 1, wherein:
    said determining determines if said first digital message stored in said message queue should be overwritten with said second digital message based on a text string contained in a subject field of said first digital message.

7. The Short Message Service Center (SMSC) to overwrite a digital message associated with a wireless device according to claim 1, wherein:
    said determining determines if said first digital message stored in said message queue should be overwritten with said second digital message based on a text string contained in said second digital message.

8. The Short Message Service Center (SMSC) to overwrite a digital message associated with a wireless device according to claim 1, wherein:
    said first digital message is a short messaging system (SMS) message.

9. The Short Message Service Center (SMSC) to overwrite a digital message associated with a wireless device according to claim 1, wherein:
    said determining determines if said first digital message stored in said message queue should be overwritten with said second digital message based on an origination address of said first digital message.

10. A method of overwriting a digital message stored at a Short Message Service Center (SMSC), comprising:
    receiving, at a Short Message Service Center (SMSC), a first digital message associated with a wireless device and a subsequently received second digital message associated with said wireless device;
    determining, at said SMSC, that said first digital message stored in a message queue should be overwritten with said second digital message; and
    overwriting, at said SMSC, said first digital message with said second digital message if said determination positively determines that said first digital message should be overwritten with said second digital message.

11. The method of overwriting a digital message stored at a Short Message Service Center (SMSC) according to claim 10, wherein:
    said second digital message is received by said wireless device on-demand in response to an on-demand request message.

12. The method of overwriting a digital message stored at a Short Message Service Center (SMSC) according to claim 11, wherein:
    said on-demand request message utilizes a mobile originated short message.

13. The method of overwriting a digital message stored at a Short Message Service Center (SMSC) according to claim 10, wherein:
    said wireless device is a telephone.

14. The method of overwriting a digital message stored at a Short Message Service Center (SMSC) according to claim 10, further comprising:
    alerting a user of said wireless device of said overwrite of said first digital message.

15. The method of overwriting a digital message stored at a Short Message Service Center (SMSC) according to claim 14, wherein:
said alerting said user includes an audible alerting sound.

16. The method of overwriting a digital message stored at a Short Message Service Center (SMSC) according to claim 14, wherein:
said alerting said user includes a message placed on a display of said wireless device.

17. The method of overwriting a digital message stored at a Short Message Service Center (SMSC) according to claim 10, wherein:
said source of said first digital message comprises an origination address of said first digital message; and
said source of said second digital message comprises an origination address of said second digital message.

18. The method of overwriting a digital message stored at a Short Message Service Center (SMSC) according to claim 10, further comprising:
matching a first message identifier associated with said first digital message and a second message identifier associated with said second digital message as a basis to determine if said first digital message should be overwritten with said second digital message.

19. A method of overwriting a digital message associated with a wireless handset, comprising:
receiving, at a wireless handset, a first digital message;
storing, at said wireless handset, said first digital message in a message queue;
subsequently receiving, at a wireless handset, a second digital message;
determining, at said wireless handset, if an origination address of said first digital message matches an origination address of said second digital message; and
in response to a positive said determination, overwriting said first digital message in said message queue with said second digital message.

20. The method of overwriting a digital message associated with a wireless handset according to claim 19, wherein:
said positive match is a result of said keyword match in both said first digital message and said second digital message.

21. The method of overwriting a digital message associated with a wireless handset according to claim 19, wherein:
said first digital message is a short messaging system (SMS) message.

22. The method of overwriting a digital message associated with a wireless handset according to claim 19, wherein:
said second digital message is a short messaging system (SMS) message.

23. The method of overwriting a digital message associated with a wireless handset according to claim 19, wherein:
said receiving said first digital message is in response to an on-demand request message.

24. The method of overwriting a digital message associated with a wireless handset according to claim 23, wherein:
said on-demand request message utilizes a mobile originated short message.

25. The method of overwriting a digital message associated with a wireless handset according to claim 19, wherein:
said wireless handset is a telephone.

26. The method of overwriting a digital message associated with a wireless device according to claim 19, wherein:
alerting a user of said wireless handset of said overwrite of said first digital message.

27. The method of overwriting a digital message associated with a wireless handset according to claim 26, wherein:
said alert includes an audible alerting sound.

28. A wireless handset to overwrite a digital message, comprising:
a receiver, at a wireless handset, to receive a first digital message to subsequently receive a second digital message;
a message queue, at said wireless handset, to store said first digital message;
a determiner to determine, at said wireless handset, if an origination address of said first digital message matches an origination address of said second digital message; and
a controller, at said wireless handset, to overwrite said first digital message with said second digital message in response to a positive said match.

29. The wireless handset to overwrite a digital message according to claim 28, wherein:
a positive said match is a result of a keyword match contained in a subject field of said first digital message and a subject field of said second digital message.

30. The wireless handset to overwrite a digital message according to claim 28, wherein:
said first digital message is a short messaging system (SMS) message.

31. The wireless handset to overwrite a digital message according to claim 28, wherein:
said second digital message is a short messaging system (SMS) message.

32. The wireless handset to overwrite a digital message according to claim 28, wherein:
said receiving said first digital message is in response to an on-demand request message.

33. The wireless handset to overwrite a digital message according to claim 32, wherein:
said on-demand request message utilizes a mobile originated short message.

34. The wireless handset to overwrite a digital message according to claim 28, wherein:
said wireless handset is a telephone.

35. The wireless handset to overwrite a digital message according to claim 28, wherein:
said controller alerts a user of said wireless device of said overwrite of said first digital message.

36. The wireless handset to overwrite a digital message according to claim 35, wherein:
said alert includes an audible alerting sound.

* * * * *